United States Patent

Aldred

[15] 3,645,076
[45] Feb. 29, 1972

[54] FLAIL MOWER

[72] Inventor: Edward John Aldred, Ipswich, England

[73] Assignee: Ransomes Sims & Jefferies Limited, Ipswich, Suffolk, England

[22] Filed: Mar. 20, 1970

[21] Appl. No.: 21,366

[30] Foreign Application Priority Data

Apr. 1, 1969 Great Britain.......................17,043/69

[52] U.S. Cl..............................................................56/294
[51] Int. Cl. .........................................................A01d 55/20
[58] Field of Search....................56/294, 504, 505, 289, 12.7

[56] References Cited

UNITED STATES PATENTS

| | | | |
|---|---|---|---|
| 2,110,147 | 3/1938 | Mable | 56/294 X |
| 3,465,507 | 9/1969 | Fishaw | 56/294 |

Primary Examiner—Russell R. Kinsey
Assistant Examiner—J. A. Oliff
Attorney—Ira Milton Jones

[57] ABSTRACT

A flail mower has cutting blades suspended by flail rods from a horizontal rotatable shaft. The center portion of each rod is curved through 90° to form a radial arm and a pivot arm at opposite ends of the rod. The pivot arm is a close sliding and rotational fit in an aperture in a lug on the shaft, the axis of the aperture being parallel to the axis of the shaft. The pivot arm is located in position by a detachable spring clip on the distal end of the pivot arm, so that the flail rod and blade can be removed from the shaft by detaching the clip and sliding the pivot arm end of the rod out of the aperture. The radial arm extends through an aperture in the cutting blade and is formed with an enlarged head which retains the blade on the arm when subjected to centrifugal force upon rotation of the shaft. The blade is slidable along the radial arm and then along the pivot arm for removal from the rod when the rod is removed from the shaft.

9 Claims, 5 Drawing Figures

Patented Feb. 29, 1972
3,645,076
2 Sheets-Sheet 1
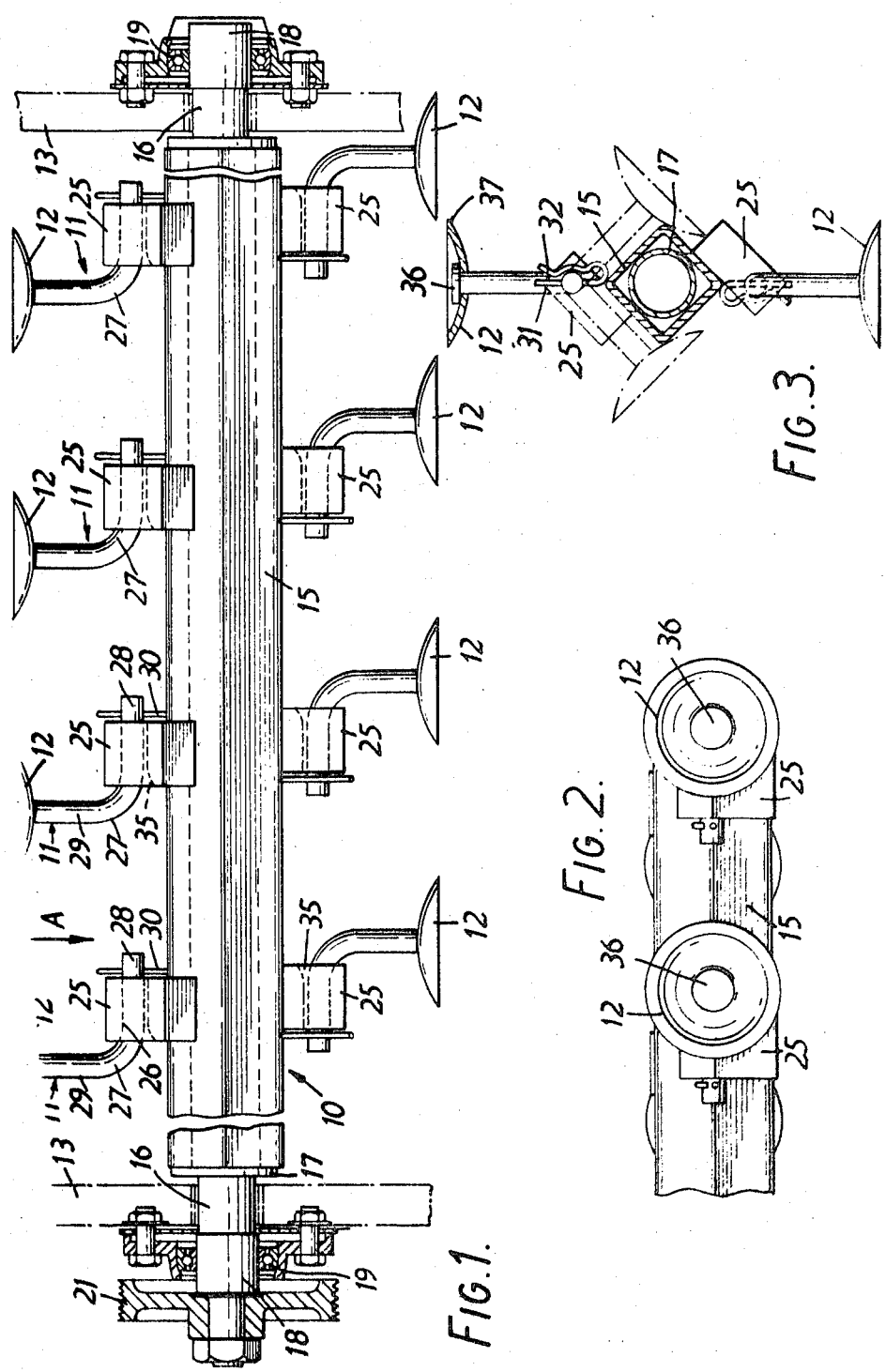
INVENTOR
Edward John Aldred
BY
ATTORNEY Patented Feb. 29, 1972

INVENTOR
Edward John Aldred
BY
ATTORNEY

FLAIL MOWER

This invention relates to flail mowers for cutting grass.

A flail mower has a cutting blade freely suspended from a horizontal shaft by a flail which usually comprises a chain or swing arm. The blade may comprise a separate component fitted on the flail, or an edge of the flail may be sharpened to form the blade. In operation the shaft is rotated at a sufficient speed so that the blade is held out radially with respect to the shaft by centrifugal force and cuts the grass by impact. If the cutting blade should strike a rigid object such as a stone, brick or even a mound of earth, the flail swings rearwards and inwards relative to the shaft so as to reduce the effective flail diameter. The cutting blade can thus ride over the obstruction and there is little risk of damage.

Flail mowers generally have a number of cutting blades each mounted on a separate flail rod, the blades being spaced across the mower so as to cut a broad swath. The flail rods may be mounted independently on the shaft, or may be mounted on the shaft as a group. In previous known constructions having independently mounted flail rods the shaft and mechanism for mounting each rod are expensive to manufacture. On the other hand previous known constructions having the flail rods mounted on the shaft as a group have the disadvantage that the labor cost for replacing a blade are much higher than with independently mounted flail rods.

According to the invention there is provided a flail mower having a cutting blade suspended by a flail from a horizontal rotatable shaft, wherein the flail comprises a rod curved intermediate its ends to form a radial arm and a pivot arm substantially perpendicular to the radial arm, the radial arm carrying the cutting blade and the pivot arm being mounted in a transverse bore in a lug or flange on the shaft for angular movement about an axis substantially parallel to the axis of the shaft, and locking means retaining the pivot arm in the bore, the pivot arm being removable from the bore upon release of the locking means. The locking means preferably comprises a spring clip detachably mounted on the end of the pivot arm.

In the flail mower of the invention the means for mounting the flail rod on the shaft is simple and inexpensive to manufacture, and the flail can readily be removed from the shaft for replacement of a cutting blade.

The cutting blade is preferably a separate component having an aperture through which the radial arm of the flail rod extends as a sliding fit, the outer end of the radial arm being provided with a head which retains the blade on the arm when subjected to centrifugal force upon rotation of the shaft, the cutting blade being slidable along the rod for removal therefrom when the rod is removed from the shaft.

The shape of the blade may be generally hexagonal, square, oval or triangular. The blade, however, preferably comprises a circular disc deformed into a part-spherical shell and having a central aperture for passage of the radial arm of the flail rod, the blade being arranged with its concave side facing radially outwards and the head on the radial arm being small enough to be inside the swept diameter of the blade. Such a blade has the advantage that its cutting edge may be formed by grinding the periphery of the shell against a flat surface. By having the cutting blade in disc form, a cutting surface parallel to the ground is presented to the grass yet the disc is free to rotate about the flail rod and can provide a continuing sharp edge to the grass.

The flail mower according to the invention may comprise a self-propelled or tractor-drawn machine adapted to be mounted on and driven by a tractor. The mower of course preferably includes a number of flails spaced apart along the flail shaft and arranged to cut a broad swath in the grass being mown.

One construction of a flail mower according to the invention will now be described, by way of example, with reference to the accompanying drawings, in which:

FIG. 1 is a view of the flail shaft assembly of the mower with the flails shown in their extended positions when subjected to centrifugal force upon rotation of the shaft.

FIG. 2 is a view of part of the shaft assembly of FIG. 1, taken in the direction of arrow A, FIG. 3 is a cross-sectional view through the shaft assembly of FIG. 1.

Figure 4:
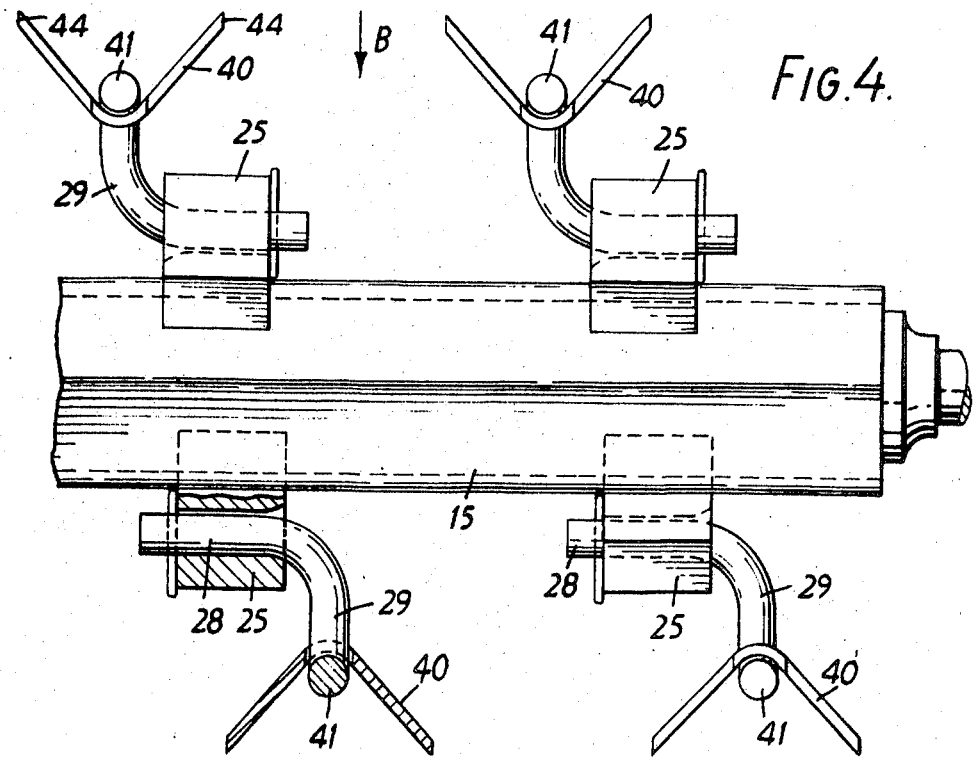
FIG. 4 shows part of a shaft assembly having the shaft and flail rods of FIG. 1 but with cutting blades of a different construction.

The flail mower of this construction comprises a wheeled carriage adapted to run along the ground, a flail shaft which extends horizontally across the mower and is rotatably mounted at its ends on the carriage, the flail shaft being provided with flails fitted with cutting blades, and a motor mounted on the carriage and drivably connected to the flail shaft. Only the flail shaft 10 with its bearings and drive pulley, the flails 11 and the cutting blades 12 are shown in full lines in FIG. 1, with part of the sidewalls 13 of the carriage shown in broken lines.

The flail shaft comprises a square section tube 15 (FIG. 3) and two cylindrical section stub shafts 16 secured one in each end of the tube. Each stub shaft 16 has a large diameter inner end 17 which is a close fit within and welded to the tube, and a smaller diameter portion 18 which extends with clearance through an aperture in the adjacent sidewall 13 of the carriage and is rotatably mounted in a ball bearing 19 supported in a housing bolted to the outer surface of the sidewall 13. The outer end of one of the stub shafts 16 is fitted with a pulley 21 drivably connected by a belt (not shown) to the drive shaft of the motor for rotation of the flail shaft.

The square section tube 15 is fitted with rectangular section pivot blocks 25, half of which are spaced along one of the flat faces of the tube and the other half spaced along the diametrically opposite flat face and approximately opposite the corresponding blocks on the first face of the tube. The pivot blocks 25 are welded to the tube and project outwards beyond one edge of the associated face of the tube as shown in FIG. 3, the blocks on one face projecting outwards in the opposite direction from the pivot blocks on the opposite face. The outer projecting end of each pivot block 25 has a transverse bore 26, the axis of which is parallel to the axis of the flail shaft 10, the bores 26 all lying in a common plane passing through the axis of the shaft 10.

The flails 11 are mounted one on each of the pivot blocks 25. Each flail comprises a circular section steel rod 27 which is curved intermediate its ends to form a pivot arm 28 and a radial arm 29 arranged approximately at right angles to one another. The pivot arm 28 projects through the bore 26 in the associated pivot block and is held in position therein by a spring cotter hairpin clip 30. The clip is substantially U-shaped, one leg 31 of the clip being straight and extending through a transverse aperture in the end of the pivot arm 28 and the other leg 32 of the clip having a concave portion which engages as a snug fit around part of the wall of the pivot arm. One end 35 of the bore 26 in the pivot block is flared outwards with a curvature corresponding to that of the curved portion of the flail rod 27, and the flail rod is arranged so that the curved portion engages along the wall of the flared end of the bore and the spring clip 30 is spaced close to the opposite end of the pivot block 25. There is thus little free axial movement of the pivot arm 28 within the bore 26, but the flail rod is nevertheless free to pivot about the axis of the bore.

The radial arm 29 of each flail rod extends through a central aperture in the associated cutting blade 12 and the outer end of the radial arm 29 is enlarged to form a head 36 which retains the blade 12 on the arm. The blade 12 is formed from a circular disc of sheet steel deformed into a shallow part-spherical shell, the periphery of the shell being rough ground on a flat surface to form a cutting edge 37 on the shell. The aperture for passage of the radial arm 29 is formed in the center of the shell, and the blade is mounted on the radial arm with the concave side of the shell facing radially outwards from the flail shaft. The head 36 is of a size such that it is located wholly within the concave interior of the blade 12 when the blade is engaged against the head.

The flails mounted on the pivot blocks 25 on one face of the tube 15 are arranged so that their pivot arms 28 extend into the left hand end of the bores in their pivot blocks, and the flails mounted on the pivot blocks 25 on the opposite face of the tube 15 are arranged so that their pivot arms extend into the right-hand end of the bores in their pivot blocks. The radial arms 29 and the blades 15 are thus offset relative to one another along the length of the tube 15.

In operation, upon rotation of the shaft 10 the blades 12 are forced outwards by centrifugal force against the heads 36 on the ends of the radial arms 29. The radial arms are thus maintained in a radial position relative to the shaft 10, and the blades 12 are of a size such that they cooperate to cut a broad swath in the grass being mown. If the blade strikes a solid object, the flail rod 27 pivots rearwards relative to the rotational direction of the shaft about the axis of the bore 26 in its pivot block, thereby decreasing the radial distance of the blade 12 from the axis of the shaft 10. The centrifugal force holds the blade 12 centered on the flail rod 27 so that the circular cutting edge 37 on the periphery of the blade is substantially parallel to the ground upon passage of the blade below the shaft. Moreover rotation of the blade 12 around the radial arm 29 of the flail rod will cause different parts of the cutting edge to engage the grass in successive revolutions of the flail shaft.

Since the flails and cutting blades on one face of the square section tube 15 are offset from their respective pivot blocks 25 in the opposite direction from the offset of the flails and blades relative to their pivot blocks on the opposite face of the tube 15, the moments of force produced on the flail shaft by the cutting blades and flails when rotating substantially balance out one another.

A flail rod 27 together with its blade 12 can readily be removed from the flail shaft by manually withdrawing the clip 30 from the rod 27 and then withdrawing the rod from the bore 26 in the pivot block. The blade 12 can then be removed from the flail rod 27 by sliding it down the radial arm 29, around the curved portion of the rod, and off the end of the pivot arm 28.

The length of the radial arm 29 and the shape and size of the blade 12 is so selected in relation to the position of the bore 26 in the pivot block as to obtain the maximum reduction in operative diameter when the flail swings back to its radially innermost position upon striking an object. In this position the radial arm 29 lies adjacent and approximately parallel to one flat face of the square section tube 15 and the back of the blade 12 abuts against the adjacent flat face of the tube, as shown in broken lines in FIG. 3.

Figure 5:
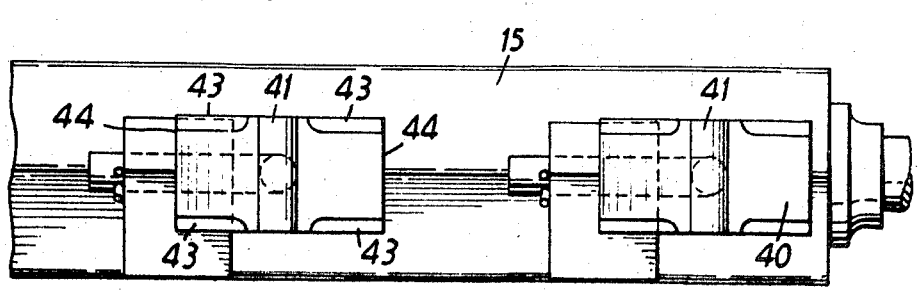
FIG. 5 is a view of the shaft assembly of FIG. 4, taken in the direction of arrow B.

The arrangement shown in FIGS. 4 and 5 has cutting blades 40 and heads 41 on the flail rods of a different construction to those shown in FIGS. 1-3. The other components of the two arrangements are however identical and are denoted on the drawings by the same reference numerals.

Each cutting blade 40 shown in FIGS. 4 & 5 consists of a rectangular plate of sheet steel folded transversely into the shape of a V, the apex of the V-shaped blade having an aperture for passage of the radial arm 29. The head 41 on the radial arm comprises a crossbar welded transversely across the end of the radial arm and arranged normal to the axis of the shaft 10. When the blade 40 is forced outwards by centrifugal force, the transverse fold in the blade lies along the crossbar on the radial arm. The side edges 43 and ends 44 of the blade 40 are bevelled to form cutting edges.

I claim:

1. A flail mower comprising a horizontally extending rotatable shaft having thereon intermediate its ends a lug with a transverse bore substantially parallel to the axis of the shaft, a flail mounted on said lug and comprising a rod curved intermediate its ends to form inner and outer end portions substantially perpendicular to one another, the inner end portion of said rod forming a pivot arm which is mounted in the lug bore for free angular movement about an axis substantially parallel to that of the shaft, a cutting blade supported on the outer end portion of said rod, and releasable locking means retaining the pivot arm in said transverse bore, whereby the pivot arm can be removed from the lug upon release of the locking means to provide for disconnection of the flail from the shaft.

2. A flail mower as claimed in claim 1, wherein the pivot arm projects through the bore and the locking means are detachably mounted on said projecting end of the pivot arm.

3. A flail mower as claimed in claim 2, wherein the locking means comprises a spring clip detachably mounted on the end of the pivot arm.

4. A flail mower as claimed in claim 2, wherein one end portion of the bore in the lug is flared outwards, part of the curved portion of the flail rod is a close fit against the wall of said one end portion of the bore, and the locking means on the rod abut against the lug at the other end of the bore, so that the pivot arm of the flail has little free axial movement in the transverse bore.

5. A flail mower as claimed in claim 1 wherein the cutting blade is formed with an aperture to slidably receive the rod, and the outer end portion of the rod is provided with a head which retains the blade thereon when subjected to centrifugal force upon rotation of the shaft, the cutting blade being slidable along the rod for removal therefrom when the pivot arm is withdrawn from the bore in the lug on the shaft.

6. A flail mower as claimed in claim 5, wherein the cutting blade comprises a disc deformed to provide a concave recess and having an edge thereof sharpened to form the cutting edge, the aperture for the rod being formed in the center of the concave portion of the blade, the blade being arranged so that its concave side faces radially outwards, and the recess being sufficiently large so that the head on the rod is inside the swept diameter of the blade.

7. A flail mower as claimed in claim 6, wherein the blade comprises a circular disc deformed into a part-spherical shell.

8. A flail mower as claimed in claim 5, wherein the cutting blade comprises a metal plate deformed into the shape of a V and having a central aperture in the apex of the V for passage of the flail rod, the head on the rod comprising a crossbar welded to the end of the outer end portion.

9. A flail mower as claimed in claim 1 and including a plurality of said flails arranged in two sets and carried by lugs mounted on diametrically opposite sides of the shaft, the flails of one set having their pivot arms extending through the bores in their associated lugs in a direction towards one end of the shaft, and the flails of the other set having their pivot arms extending in the opposite direction through the bores of their associated lugs, whereby during rotation of the shaft the moments of force produced on the shaft by one set of flails is at least partially balanced by the moments of force produced by the other set of flails.

* * * * *